United States Patent Office 3,457,164
Patented July 22, 1969

3,457,164
HYDROREFINING BLACK OILS WITH A COMBINATION OF HALOGEN HYDRIDES
John G. Gatsis, Des Plaines, Ill., assignor to Universal Oil Products Company, Des Plaines, Ill., a corporation of Delaware
No Drawing. Filed Feb. 6, 1967, Ser. No. 614,030
Int. Cl. C10g 31/14, 23/06, 17/00
U.S. Cl. 208—209   3 Claims

ABSTRACT OF THE DISCLOSURE

Hydrogen chloride is added to a process for hydrorefining/hydrocracking black oils wherein nitrogenous compounds are converted to ammonia. The hydrogen chloride is added to a mixture of black oil and catalytic agent, which is either hydrogen bromide or hydrogen iodide, in order to form ammonium chloride during the hydrorefining reaction and thus preserve the catalytically active hydrogen bromide or iodide in the reaction mixture. The formation of ammonium chloride is also more advantageous because is lower sublimation temperature (640° F.) permits lower temperatures to be used within the reactor.

APPLICABILITY OF INVENTION

The present invention constitutes an improvement in those processes designed to effect the hydrorefining and/or hydrocracking of hydrocarbonaceous charge stocks generally referred to as black oils. More specifically, the processes to which my invention is applicable are those which utilize, as the catalytic agent, a halogen hydride of a halogen selected from the group consisting of iodine and/or bromine.

Black oils, particularly atmospheric and vacuum residuum, or tower bottoms, contain high molecular weight sulfurous compounds, large quantities of nitrogenous compounds, high molecular weight organo-metallic complexes, principally comprising nickel and vanadium, and a considerable quantity of asphaltic material insoluble in lower boiling hydrocarbons such as pentane and/or heptane. An abundant supply of such hydrocarbonaceous material currently exists, most of which has a gravity API at 60° F., less than 20.0, and a significant proportion of which has a gravity less than 10.0 API. Black oils are further characterized in that the boiling range thereof indicates that 10.0% by volume, or more, boils above a temperature of 1050° F.

Specific examples of the black oils, a process for the conversion of which advantageously utilizes the present invention, include a vacuum tower bottoms product having a gravity of 7.0 API at 60° F., and containing 4.1% by weight of sulfur and 23.7% by weight of asphaltics; a Middle-east crude oil having a gravity of 11.0 API at 60° F., containing 10.1% by weight of asphaltics and about 5.2% by weight of sulfur; and a vacuum residuum having a gravity of 8.8 API at 60° F., and containing 3.0% by weight of sulfur and 4300 p.p.m. of nitrogen, and having a 20.0% volumetric distillation temperature of 1055° F. In general, the asphaltics are found to be colloidally dispersed in the black oil, and, when subjected to elevated temperature, have the tendency to flocculate and polymerize, whereby the conversion thereof to more valuable oil-soluble products becomes extremely difficult.

Black oil conversion processes utilize hydrocracking/hydrorefining techniques for the principal purposes of (1) reducing the concentration of various contaminating influences (primarily sulfur and nitrogen-containing compounds as well as metallic complexes), and (2) to convert the heavy hydrocarbonaceous material into lower boiling hydrocarbon products which are significantly reduced in the concentration of the foregoing contaminants. With respect to the latter, since the heavier portion of the black oils—i.e. boiling above about 1050° F.—contains a considerable quantity of asphaltics which are insoluble in light hydrocarbons including pentane and heptane, it is economically attractive to convert as much of this asphaltic portion into hydrocarbon-soluble products.

In view of the physical and chemical characteristics of black oils, conversion processes employing a fixed-bed of a catalytic composite have been considered to be non-feasible on an economic basis as a result of the deposition of large quantities of unreacted asphaltics onto and throughout the catalyst and processing equipment. Thus, many conversion processes operate with a non-solid catalytic agent including the halogen hydrides, especialy hydrogen iodide and hydrogen bromide, although so-called "HF-cracking" has been described in the literature as has sulfuric acid and hydrochloric acid.

The present invention constitutes an improvement in those conversion processes which employ non-solid catalytic agents, and particularly the halogen hydrides where the halogen is selected from the group consisting of iodine and bromine, and mixtures thereof. In a broad embodiment, therefore, the present invention affords an improvement in a process for hydrorefining black oils containing sulfurous and nitrogenous compounds, and metallic contaminants, in which process a halogen hydride of a halogen selected from the group consisting of iodine, bromine and mixtures thereof is employed as the catalytic agent in admixture with said black oil, and which halogen hydride forms ammonium halide during the process, which improvement comprises adding hydrogen chloride to the mixture of black oil and the catalytic agent to form ammonium chloride, thereby maintaining said halogen in its catalytically active hydride form.

A principal object of my invention is, therefore, to provide an improvement in a black oil conversion process which utilizes a halogen hydride as the catalytic agent.

A corollary object is to conserve and maintain a halogen hydride catalytic agent in its active hydride form.

Other embodiments involve adding the hydrogen chloride in an amount such that substantially all the ammonia, resulting from the conversion of nitrogenous compounds reacts therewith to form ammonium chloride rather than ammonium iodide and/or ammonium bromide as the case may be. Thus, the hydrogen chloride is added in an amount in excess of the concentration of nitrogenous compounds, and preferably from about 101.0% to about 120.0% of the stoichiometric amount. Further, since the sublimation temperature of ammonium chloride is about 640° F. (337.8° C.), the conversion zone effluent is maintained at a temperature above this level to insure that the ammonium chloride does not solidify prior to the intended separation thereof from the remaining portion of the effluent.

PRIOR ART

While it is recognized that the prior art abounds with disclosures of the use of halogen hydrides in various heavy hydrocarbon conversion processes, I believe that there is no recognition therein of the improvement to be attained through the use of my invention. Exemplary of the prior art, and illustrative of the processes to which the instant improvement might be adapted, include U.S. Patent No. 3,044,956 (Cl. 208—252) which discloses a scheme for treating petroleum residuals to remove metallic contaminants. The catalytic agent is anhydrous hydrogen iodide and/or hydrogen bromide in admixture with a hydroaromatic material. The catalytic agent is added in an amount of 0.01% to about 3.0% by weight of the residual material to be treated. It is important to note that there is no appreciation of the fact that the halogen hydride will react with the ammonia, thereby forming an ammonium halide and thus effectively removing the hydride from further catalytic action.

U.S. Patent No. 2,744,853 (Cl. 208—251) discusses the conversion of oil-soluble metal compounds utilizing elemental iodine (which would form hydrogen iodide in the conversion zone) into oil-insoluble metal containing compounds which are subsequently separated from the treated product in the form of an insoluble sludge. Significantly, the present invention is not principally concerned with creating an insoluble metal-containing sludge, but rather with preserving the catalyst agent in its catalytically active hydride form, as distinguished from losing the agent as ammonium halide in the insoluble metal-containing sludge.

The use of iodine and/or hydroiodic acid to form insoluble iodides of nickel, vanadium, iron and copper (acknowledged as the predominant contaminating metals existing as complexes), is disclosed in U.S. Patent No. 2,729,593 (Cl. 208—251). The insoluble iodides are removed by commonly utilized separation means including filtration, settling, centrifuging, etc. It is preferred, in accordance with this disclosed process, to effect demetallization without effecting a substantial degree of conversion to lower boiling products. Since conversion reactions are not effected, ammonia is not formed as a result of the destruction of nitrogenous compounds, and no ammonium iodide is formed. Obviously there is no concern in this process for conserving the catalytic agent, and especially since it is particularly desired that no conversion be effected.

Although U.S. Patent No. 2,971,905 (Cl. 208—252) discloses the treatment of heavy hydrocarbon mixtures with hydrogen halides, and specifically with hydrogen chloride, the process is mainly concerned with employing the halide for the purpose of coagulating the unconverted nonvolatile metallic porphyrins remaining after an initial hydrotreating step conducted in the absence of the halogen hydride. There exists no recognition of using hydrogen iodide and/or hydrogen bromide for the purpose of effecting hydrorefining/hydrocracking reactions, and, it naturally follows that there is no concern for conservation of these anhydrous halides.

The foregoing examples of the prior art disclosures in the area of halogen hydride conversion of black oils clearly indicate non-recognition of the problems associated with the use of HI and HBr, and obviously, therefore, have no appreciation of the solution thereto as herein set forth.

SUMMARY OF INVENTION

In view of the foregoing described embodiments, and the discussion of the current state of published knowledge, it is readily ascertained that the present invention is an improvement to be adapted to those processes designed to convert contaminated, heavy hydrocarbon charge stocks using hydrogen bromide and/or hydrogen iodide as a non-solid catalytic agent. In the interest of brevity, the following dissertation will be limited to HBr hydrorefining/hydrocracking of such charge stocks.

The use of hydrogen bromide, in the absence of a solid catalytic composite, is generally accomplished by admixing the hydrocarbon charge stock with about 1000 to 10,000 s.c.f./bbl. of hydrogen, and from 0.1% to about 30.0% by weight of HBr, the mixture passing into a suitable enclosed vessel maintained under pressures ranging from about 500 to about 4000 p.s.i.g. Prior to being introduced to the reaction zone, the mixture is heated to the desired temperature in the range of from about 300° F. to about 1,000° F., the precise conditions being dependent upon the characteristics of the charge stock. In any event, under these conditions, and in the presence of anhydrous hydrogen bromide, sulfurous and nitrogenous compounds are converted into hydrogen sulfide, ammonia and hydrocarbons; at least a portion of the asphaltic fraction is converted into more valuable lower boiling hydrocarbon-soluble product; and, the metallic complexes are at least in part converted to metal-free hydrocarbons.

The problems associated with such a process are numerous; principal among them is the loss of HBr as a result of the formation of ammonium bromide as a constituent of the conversion zone effluent. Since ammonium bromide exists as a solid at temperatures below its sublimation point, 1008° F. (542° C.), separation of the effluent to concentrate the sludge consisting principally of unreacted asphaltics and metallic complexes causes the ammonium bromide to become a constituent of the sludge. Some of the HBr is also lost as a result of the formation of metallic bromides which also form part of the sludge. Another difficulty stems from the fact that the reaction zone, the effluent therefrom and the manifold lines necessary to transport the effluent to suitable separation means must necessarily be maintained at an elevated temperature to avoid severe plugging as a result of the solidification of the ammonium and metallic bromides. It should be noted further that the sublimation temperature of ammonium iodide is about 761° F. (404.9° C.). However, this too limits unduly the temperature to which the conversion product effluent can be lowered—i.e. by service as a heat-exchange medium in raising the temperature of the fresh charge stock, hydrogen and halogen hydride mixture.

The addition of hydrogen chloride, preferably in an amount in excess of the stoichiometric quantity based up the degree of nitrogenous compound conversion, from 101.0% to about 120.0%, avoids these difficulties in a two-fold manner; first, the ammonia will preferably form ammonium chloride rather than ammonium bromide or iodide, the latter will retain its catalytically active hydride form. Having a significant lower sublimation temperature of 640° F. (337.8° C.), the ammonium chloride, as distinguished from either ammonium bromide or the iodide, permits lower temperatures within the reactor, the manifolding, etc. while avoiding severe plugging thereof. It might be added that the chloride also effectively ties up the metals such that there is little loss of hydrogen bromide to metallic bromides.

With respect to the product from the conversion zone, it is only necessary, of course, to insure that the temperature of the transfer lines be maintained at a temperature above the sublimation temperature of ammonium chloride until the effluent is subjected to separation. At this stage, the temperature may be lowered to a convenient separation temperature, the ammonium chloride thus forming a constituent of the metal and unreacted asphaltic sludge. The remaining portion of the product effluent is then subjected to conventional separation techniques for the recovery of the catalytic agent which may then be recycled to the conversion zone. Such separation techniques are well within the purview of one skilled in the art, and, since they form no part of the present invention, will not be described in detail.

EXAMPLES

The following examples are presented for the primary purpose of illustrating the improvement afforded a process designed to effect the HBr hydrorefining/hydrocracking of severely contaminated, high boiling hydrocarbon charge stocks. It is not intended that the present invention be limited to the specific charge stock, the operating conditions, reagents and concentrations thereof, etc.

The charge stock is a vacuum tower bottoms product obtained from a sour Wyoming crude oil of which only 9.4% by volume was distillable at a temperature of 1000° F. Other characteristics are presented below:

TABLE I.—VACUUM BOTTOMS PROPERTIES

| | |
|---|---|
| Gravity, API at 60° F. | 7.4 |
| Heptane-insoluble asphalts _____ wt. percent__ | 10.48 |
| Sulfur _____wt. percent__ | 3.57 |
| Nitrogen _____p.p.m__ | 5890 |

Nickel _____ p.p.m__ 46
Vanadium _____ p.p.m__ 195

The vacuum bottoms was processed in an 1800 cc. rocker-type autoclave under an imposed pressure of 200 atmospheres of hydrogen, at a temperature of 400° C. (752° F.), for a period of about four hours. Hydrogen bromide, in an amount of about 20.0 grams, and 200 grams of the vacuum bottoms constituted the contents of the autoclave.

At the termination of the 4-hour test period, the contents of the autoclave were analyzed. The analyses are present in the following Table II. Included in Table II, for ease of comparison, are the results obtained in an identical 4-hour period conducted without the addition of hydrogen bromide.

TABLE II.—COMPARISON OF RESULTS, WITH AND WITHOUT HYDROGEN BROMIDE

|  | HBr added | No HBr |
|---|---|---|
| Gravity, API at 60° F_____ | 27.2 | 14.1 |
| Heptane, insolubles_____ | 0.2 | 8.17 |
| Sulfur, wt. percent_____ | 0.69 | 1.53 |
| Nitrogen, p.p.m_____ | 300 | 5200 |
| Metals, p.p.m. (total)_____ | 1.0 | [1] 155 |

[1] About 35 nickel and 120 vanadium.

The volume percent distillable at 1000° F. was 82.2. Analyses undertaken to determine the distribution of bromide indicated that 37.7% by weight was "tied up" as ammonium bromide, and 48.2% by weight as metallic bromides, a total of 86.4%.

The test period with hydrogen bromide addition is repeated at approximately the same conditions of 400° C. and 200 atmospheres of hydrogen. The contents of the vessel include 20.0 grams of hydrogen bromide, 200 grams of the vacuum tower bottoms and hydrogen chloride in an amount of 105.0% of the stoichiometric amount based upon the 5890 p.p.m. of nitrogen, and with the assumption that all the nitrogen is converted into ammonia.

Analyses of the autoclave contents, following this 4-hour test period indicate results comparable to those obtained previously; the gravity, API at 60° F., is about 28.5, somewhat higher; the heptane-insolubles remaining was 0.22% by weight, for practical purposes the same; and, the degree of de-contamination, with respect to sulfur, nitrogen and metals, is virtually identical. However, analyses, and a chlorine and bromine balance show about 85.0% chlorine as ammonium chloride and metallic chlorides, whereas ammonium bromide and metallic bromides are found in a concentration somewhat less than 15.0% by weight.

The foregoing specification and examples indicate the beneficial results which are afforded through the use of the present improvement in those processes utilizing halogen hydrides as catalytic agents for hydrorefining/hydrocracking of black oils. More than 85.0% by weight of the catalytic agent remains in its active hydride form.

I claim as my invention:

1. In a process for hydrorefining black oils containing sulfurous and nitrogenous compounds, and metallic contaminants, in which process a halogen hydride of a halogen selected from the group consisting of iodine, bromine, and mixtures there of is employed as the catalytic agent, which halogen forms ammonium halides during the process, the improvement which comprises adding hydrogen chloride to the mixture of black oil and the catalytic agent to form ammonium chloride, thereby maintaining said catalytic halogen in the catalytically active hydride form.

2. The improvement of claim 1 further characterized in that the hydrogen chloride is added in an amount of from 101.0% to about 120.0% of the stoichiometric amount based upon the concentration of nitrogenous compounds.

3. The improvement of claim 1 further characterized in that said hydrorefining process is effected at a temperature such that the hydrorefining effluent is at a temperature above the sublimation temperature of ammonium chloride.

References Cited

UNITED STATES PATENTS

| 3,044,956 | 7/1962 | Burk et al. _____ | 208—108 |
| 2,971,905 | 2/1961 | Bieber et al. _____ | 208—252 |

DELBERT E. GANTZ, Primary Examiner

G. J. CRASANAKIS, Assistant Examiner

U.S. Cl. X.R.

208—252, 254